United States Patent [19]
Oyama et al.

[11] Patent Number: 5,620,803
[45] Date of Patent: Apr. 15, 1997

[54] HEAT SHRINKABLE POLYPROPYLENE LAMINATE FILM

[75] Inventors: Toshikatsu Oyama; Shuichi Morita; Fumio Horita; Koji Sueoka; Hideo Isozaki, all of Kumamoto, Japan

[73] Assignee: Kohjin Co., Ltd., Tokyo, Japan

[21] Appl. No.: 648,011

[22] PCT Filed: Sep. 22, 1995

[86] PCT No.: PCT/JP95/01915

§ 371 Date: May 29, 1996

§ 102(e) Date: May 29, 1996

[87] PCT Pub. No.: WO96/09931

PCT Pub. Date: Apr. 4, 1996

[30] Foreign Application Priority Data

Sep. 29, 1994 [JP] Japan .................................. 6-258979

[51] Int. Cl.⁶ ........................................................ B32B 27/08
[52] U.S. Cl. ........................... 428/516; 428/515; 428/500; 428/519; 428/521
[58] Field of Search ................................. 428/500, 516, 428/517, 519, 521

[56] References Cited

U.S. PATENT DOCUMENTS

| 4,659,612 | 4/1987 | Balloni et al. | 428/213 |
| 5,254,394 | 10/1993 | Bothe et al. | 428/212 |
| 5,482,780 | 1/1996 | Wilkie et al. | 428/515 |

FOREIGN PATENT DOCUMENTS

| 1152880 | 8/1979 | Canada. |
| 0499216 | 8/1992 | European Pat. Off.. |

*Primary Examiner*—Charles Nold
*Attorney, Agent, or Firm*—Armstrong, Westerman, Hattori, McLeland & Naughton

[57] ABSTRACT

The heat shrinkable polypropylene film having an isotactic polypropylene layer as surface layers and a layer mainly composed of a syndiotactic polypropylene as an intermediate layer, having a shrinkage of not less than 25% at 100° C. in the machine and transverse directions and being stretched at least two times in the machine and transverse directions, respectively. The film has a good packaging machine applicability and excellent propagation tear resistance, low temperature shrinkability and heat resistance, and is suitably used as a shrink packaging material.

2 Claims, 1 Drawing Sheet

HEAT SHRINKABLE POLYPROPYLENE LAMINATE FILM

TECHNICAL FIELD

The present invention relates to a shrink packaging material, and more particularly to a heat shrinkable polypropylene laminate film having an intermediate layer mainly comprising a syndiotactic polypropylene and having a good packaging machine applicability and excellent propagation tear resistance, low temperature shrinkability and heat resistance.

BACKGROUND ART

Stretched films such as polyvinyl chloride films, polypropylene films and polyethylene films are hitherto known as heat shrinkable films.

Among them, heat shrinkable polypropylene films have been generally used in high speed automatic packaging, since they have a good film firmness and are excellent in packaging machine applicability. However, as compared with heat shrinkable polyvinyl chloride films, the heat shrinkable polypropylene films exhibit heat sealability and heat shrinkability only at fairly high temperatures. Moreover, the propagation tear resistance and impact strength of the film are low, so it cannot necessarily be said that the heat shrinkable polypropylene films have a good applicability to packaging of heavy weight articles and the like.

The above-mentioned heat shrinkable polypropylene films are the heat shrinkable films made of crystalline isotactic polypropylene which is an already known material, copolymers composed mainly of polypropylene such as propylene-ethylene copolymer and propylene-ethylene-butene terpolymer, and mixtures of these polymers with thermoplastic polymers capable of forming a film when mixed with these polymers.

In order to eliminate the above-mentioned defects, particularly to improve the heat sealability and the propagation tear resistance, packaging films using a syndiotactic polypropylene in the surface layers are reported in Japanese Patent Publication Kokai Nos. 5-77309, 5-200957 and 5-245992.

However, though these proposals improve the heat sealability and the propagation tear resistance, it cannot be said that the low temperature shrinkability is satisfactory. Also, since the ratio of the syndiotactic polypropylene layers to the whole layers is small, the effect on the propagation tear resistance is small. Further, because the syndiotactic polypropylene having a low melting point is used in the surface layers, the films have a defect of whitening if a package is shrinked at high temperatures.

The present invention is intended to provide a film constitution which improves the low temperature heat shrinkability and the propagation tear resistance without deteriorating the packaging machine applicability and optical property that conventional heat shrinkable films using a polypropylene resin possess, and moreover which has a wide range of heat shrinking temperature.

DISCLOSURE OF THE INVENTION

The present inventors have made intensive studies to solve the above-mentioned problems, and as a result, they have found that a heat shrinkable polypropylene film having excellent packaging machine applicability and low temperature heat shrinkability and an improved propagation tear resistance is obtained by using a specific polypropylene resin and conducting coextrusion with setting a specific layer thickness ratio. Thus they have arrived at the present invention.

That is to say, the heat shrinkable film of the present invention is a polypropylene laminate film stretched at least two times in both the machine and transverse directions, characterized in that the surface layers comprise an isotactic polypropylene and the intermediate layer consists essentially of 50 to 100% by weight of a syndiotactic polypropylene and 0 to 50% by weight of an isotactic polypropylene, and that the thickness of the intermediate layer is not less than 30% of the total thickness of all layers, the thickness of each of the surface layers is at least 1 µm, and the shrinkage of the film at 100° C. is not less than 25% in both the machine and transverse directions.

The isotactic polypropylene used in the surface layers is known as a crystalline polypropylene, and includes a propylene-ethylene copolymer and a propylene-ethylene-butene terpolymer which are composed mainly of an isotactic polypropylene and have not more than 15% by weight of n-heptane-soluble fraction, and mixtures of these polymers with a thermoplastic polymer capable of forming a film when mixed with these polymers. The propylene-ethylene copolymer and the propylene-ethylene-butene terpolymer are those containing 2 to 10% by weight of units of ethylene or units of ethylene and butene. As the thermoplastic polymer, there can be used an ethylene-vinyl acetate copolymer, an ethylene-α-olefin copolymer, a propylene-butene copolymer, an ionomer, a polybutene, a petroleum resin and the like within the range not hindering objects of the present invention.

The intermediate layer must be a layer essentially containing a syndiotactic polypropylene as a main component, namely must have a resin composition of 50 to 100% by weight of the syndiotactic polypropylene and 0 to 50% by weight of the isotactic polypropylene. If the syndiotactic polypropylene is not more than 50% by weight and the isotactic polypropylene is not less than 50% by weight, a proper level of the heat shrinkage is not exhibited at low temperatures and further, the effect of improving the propagation tear resistance becomes small.

The isotactic polypropylene used as one of the components of the intermediate layer substantially corresponds to the above-mentioned isotactic polypropylene in the surface layers, but it is not always necessary that the isotactic polypropylene mixed in the intermediate layer is the same as the isotactic polypropylene resin used in the surface layers. On the other hand, the syndiotactic polypropylene is a polypropylene having a high syndiotacticity such that the syndiotactic pentad fraction measured by $^{13}$C-NMR is not less than 0.7, unlike a conventional syndiotactic polypropylene having a low syndiotacticity obtained by using a vanadium catalyst. Such a syndiotactic polypropylene can be obtained by using a catalyst composed of a co-catalyst and a crosslinking type transition metal compound having ligands non-symmetrical to each other as described in, for example, Japanese Patent Publication Kokai Nos. 2-41303, 2-41305, 2-274703, 2-274704, 3-179005 and 3-179006. Also, the measurement of syndiotactic pentad fraction by $^{13}$C-NMR can be made by a known method as described, for example, in Japanese Patent Publication Kokai No. 2-41303.

When recovered films are recycled in the intermediate layer in addition to the above resin composition, it is a matter of course that the isotactic polypropylene used in the surface layers is incorporated into the intermediate layer, and the intermediate layer may contain, in addition to the above-mentioned resin composition, other resins, e.g., an ethylene-vinyl acetate copolymer, an ethylene-α-oiefin copolymer, a propylene-butene copolymer, an ionomer, a polybutene, a petroleum resin and the like so long as the objects of the present invention are not hindered.

The thickness of the intermediate layer of the heat shrinkable laminate film of the present invention must be not less than 30%, preferably not less than 50%, of the total thickness. If the thickness ratio of the intermediate layer is less than 30%, the effect of improving the propagation tear resistance is lowered remarkably and the effect on the low temperature shrinkability is also lowered.

Further, the intermediate layer in the present invention is not necessarily composed of one layer, and can be composed of two or more layers as occasion demands. Also the thickness of the surface layer after the stretching is required to be selected so as to be at least 1 μm, preferably at least 2 μm. If the thickness of each surface layer after the stretching is less than 1 μm, the film lacks firmness and the effect of improving the packaging machine applicability in a high speed range becomes small, and in addition, since the heat resisting temperature is lowered, whitening of the film occurs, if shrinked at high temperature, at the time of shrinking after packaging objects to be packaged.

Also it is a matter of course that additives such as a lubricant, an anti-blocking agent, an antistatic agent and an anti-fogging agent may be suitably used for the purpose of providing the respective useful functions so long as the objects of the present invention are not hindered.

The heat shrinkable laminate films of the present invention are prepared by known stretching methods. As one example thereof, a detailed explanation is given below taking the case of a tubular preparation method.

Firstly, a tubular non-stretched film prepared by melt-kneading in three extruders and coextruding through a three-layered circular die so that the intermediate layer is made of a polypropylene resin comprising the above-mentioned syndiotactic polypropylene resin as a main component and the surface layers are made of an isotactic polypropylene resin, and once solidifying by rapid cooling without stretching. The obtained tubular non-stretched film is then fed to a tubular stretching apparatus, for instance, as shown in FIG. 1, and is subjected to a simultaneous biaxial orientation by inflation stretching at least 2 times, preferably at least 2.5 times, in both the machine and transverse directions within an orientable temperature range with application of a gas pressure to the inside of the tube. The film taken out of the stretching apparatus can be annealed if necessary, and spontaneous shrinkage during the storage can be inhibited by this annealing.

The feature of the present invention resides in using the syndiotactic polypropylene in the intermediate layer, thereby providing a film having good low temperature shrinkability and propagation tear resistance. Also the packaging machine applicability, optical property and heat resistance, which are advantages of the existing polypropylene films, are not impaired because the isotactic polypropylene used in the surface layers. Further, by laminating these layers, the temperature range capable of shrinking is widened to such an extent that the external appearance of the film is not impaired, so the films easy to handle can be provided.

BEST MODE FOR CARRYING OUT THE INVENTION

Figure 1:
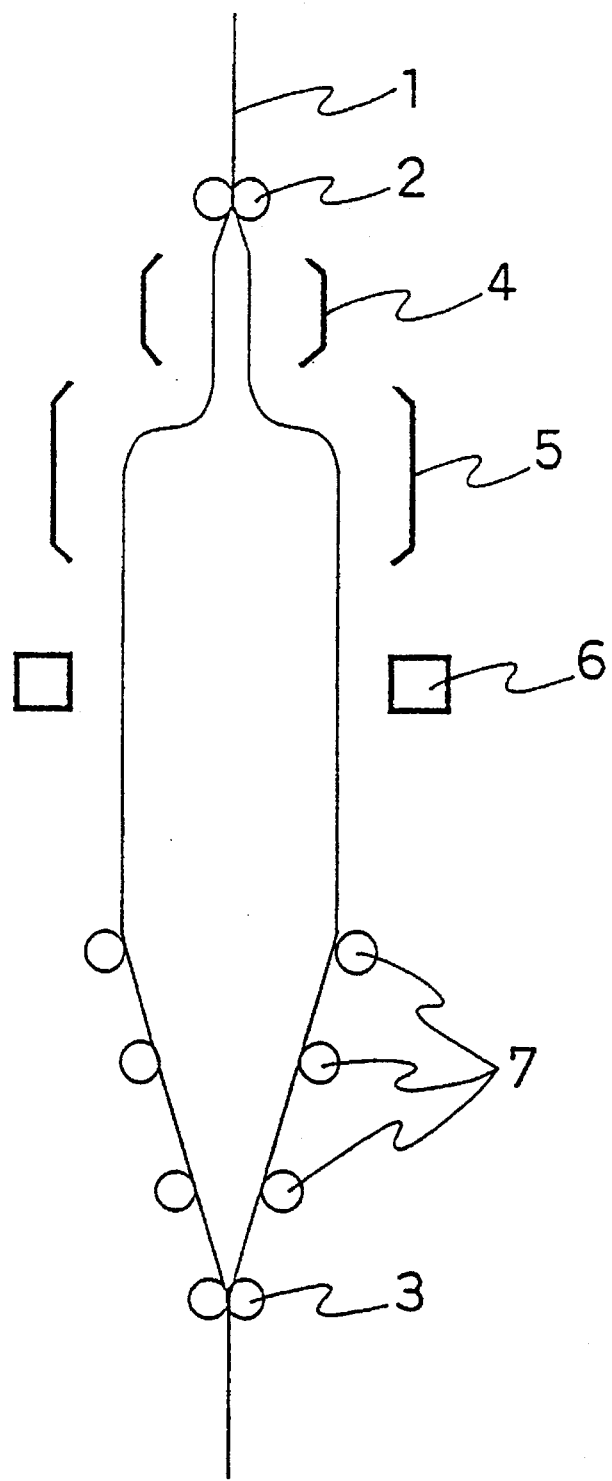
FIG. 1 is a schematic section view illustrating a tubular biaxial stretching apparatus used in Examples and Comparative Examples, wherein 1 is a non-stretched film, 2 is low-speed nip rolls, 3 is high-speed nip rolls, 4 is a preheater, 5 is a main heater, 6 is a cooling air ring and 7 is collapser rolls.

The present invention is concretely explained by means of the following Examples and Comparative Examples, but is not limited to these Examples.

The measurements shown in the Examples were made by the following methods.
1) Heat shrinkability
   Measured according to JIS Z 1709
2) Propagation tear resistance
   Measured according to JIS Z 1707
3) Packaging machine applicability
   A stretched film was applied to a commercial high speed pillow type packaging machine under the conditions that the bead sealing temperature was 220° C., the tunnel temperature was from 130° to 175° C., the running speed of the objects to be packaged was 100 pieces/minute and the shrinking tunnel passing time was 4 seconds. The evaluation was made by a yield of good finished packages.
4) Temperature range for heat shrinking
   A heat shrinking temperature range where a good packaging finish was obtained, and a temperature range where whitening and melting of the film did not occur, were measured simultaneously with the packaging machine applicability.

EXAMPLE 1

A syndiotactic polypropylene (product of Mitsui Toatsu Kagaku Kabushiki Kaisha having a syndiotacticity of 0.79 and an MI of 4.9 g/10 minutes) and an isotactic polypropylene were melt-kneaded separately in three extruders at a temperature of 200° to 250° C. and co-extruded through a three-layer circular die kept at 220° C. to form a film consisting of an intermediate layer of 100% by weight of the syndiotactic polypropylene and surface layers of 100% by weight of the isotactic polypropylene. At that time, the thickness proportion of the intermediate layer was set at 75% of the total thickness of all layers. The co-extruded tubular molten film was cooled to room temperature by sliding its inner side on the outer surface of a cylindrical cooling mandrel in which a 20° C. cooling water was circulated, and by passing the outer side through a water bath to water-cool the film, and was taken out to give a tubular non-stretched film having a thickness of 270 μm.

This tubular non-stretched film was used as a starting film and led to a tubular biaxial stretching apparatus shown in FIG. 1 and stretched 5 times in the machine direction and 4 times in the transverse direction at a temperature of 95° to 105° C. The stretched film taken out of the stretching apparatus was cooled to room temperature by a cooling air ring, collapsed and wound up. The stability of the stretching tube was good, and also non-uniform stretching state was not observed.

The obtained stretched film had an average thickness of 15.0 μm, and the thickness of each of the surface layers was 1.9 μm. The heat shrinkage at 100° C. was 30% in both the machine and transverse directions, and the propagation tear resistance was 10.3 g in the machine direction and 11.1 g in the transverse direction. As a result of evaluation of the packaging machine applicability, there were obtained heat-shrink packages having a tight feeling and soft corners within a heat shrinking temperature range where the shrinking tunnel temperature was set at a temperature of 135° to 170° C. Also there was no pin holes in the sealed portion of the obtained packages, and no breaking from an air release hole occurred.

EXAMPLE 2

Stretching of a film was carried out under the same conditions as in Example 1 with the thickness proportion of the intermediate layer being set at 75% of the total thickness of all layers except that the film was composed of an intermediate layer of 55% by weight of the syndiotactic polypropylene used in Example 1 and 45% by weight of an isotactic polypropylene and surface layers of 100% by weight of the isotactic polypropylene. The stability of the stretching tube was good, and non-uniform stretching state was not observed.

The obtained stretched film had an average thickness of 15.0 µm, and the thickness of each of the surface layers was 1.9 µm. The heat shrinkage at 100° C. was 29% in both the machine and transverse directions, and the propagation tear resistance was 9.1 g in the machine direction and 9.7 g in the transverse direction. As a result of evaluation of the packaging machine applicability, there were obtained heat-shrink packages having a tight feeling and soft corners within a heat shrinking temperature range where the shrinking tunnel temperature was set at a temperature of 135° to 170° C. Also there was no pin holes in the sealed portion of the obtained packages, and no breaking from an air release hole occurred.

EXAMPLE 3

Stretching of a film was carried out under the same conditions as in Example 1 except that the film was composed of an intermediate layer of 100% by weight of the syndiotactic polypropylene used in Example 1 and surface layers of 100% by weight of an isotactic polypropylene, and the thickness proportion of the intermediate layer was set at 50% of the total thickness of all layers. The stability of the stretching tube was good, and non-uniform stretching state was not observed.

The obtained stretched film had an average thickness of 15.0 µm, and the thickness of each of the surface layers was 3.8 µm. The heat shrinkage at 100° C. was 30% in both the machine and transverse directions, and the propagation tear resistance was 9.6 g in the machine direction and 10.3 g in the transverse direction. As a result of evaluation of the packaging machine applicability, there were obtained heat-shrink packages having a tight feeling and soft corners within a heat shrinking temperature range where the shrinking tunnel temperature was set at a temperature of 140° to 170° C. Also there was no pin holes in the sealed portion of the obtained packages, and no breaking from an air release hole occurred.

COMPARATIVE EXAMPLE 1

Stretching of a film was carried out under the same conditions. as in Example 1 with the thickness proportion of the intermediate layer being set at 75% of the total thickness of all layers except that the film was composed of an intermediate layer of 45% by weight of the syndiotactic polypropylene used in Example 1 and 55% by weight of an isotactic polypropylene and surface layers of 100% by weight of the isotactic polypropylene. The stability of the stretching tube was good, and non-uniform stretching state was not observed.

The obtained stretched film had an average thickness of 15.0 µm, and the thickness of each of the surface layers was 1.9 µm. The heat shrinkage at 100° C. was 20% in both the machine and transverse directions, and the propagation tear resistance was 6.6 g in the machine direction and 5.3 g in the transverse direction. As a result of evaluation of the packaging machine applicability, shrinking did not sufficiently occur at a shrinking tunnel temperature of 150° C., thus giving packages having a poor appearance and stiff corners. Further, there occurred breaking from an air release hole due to rubbing of the packages with each other. Also the breaking occurred at a sealed part at a shrinking tunnel temperature of 170° C.

COMPARATIVE EXAMPLE 2

Stretching of a film was carried out under the same conditions as in Example 1 except that the film was composed of an intermediate layer of 100% by weight of the syndiotactic polypropylene used in Example 1 and surface layers of 100% by weight of an isotactic polypropylene and the thickness proportion of the intermediate layer was set at 25% of the total thickness of all layers. The stability of the stretching tube was good, and non-uniform stretching state was not observed.

The obtained stretched film had an average thickness of 15.0 µm, and the thickness of each of the surface layers was 5.6 µm. The heat shrinkage at 100° C. was 18% in the machine direction and 20% in the transverse direction, and the propagation tear resistance was 3.3 g in the machine direction and 2.3 g in the transverse direction. As a result of evaluation of the packaging machine applicability, shrinking did not sufficiently occur at a shrinking tunnel temperature of 150° C., thus giving packages having a poor appearance and stiff corners. Further, there occurred breaking from an air release hole due to rubbing of the packages with each other. Also the breaking occurred at a sealed part at a shrinking tunnel temperature of 170° C.

COMPARATIVE EXAMPLE 3

Stretching of a film was carried out under the same conditions as in Example 1 except that the film was composed of an intermediate layer of 100% by weight of the syndiotactic polypropylene used in Example 1 and surface layers of 100% by weight of an isotactic polypropylene and the thickness proportion of the intermediate layer was set at 90% of the total thickness of all layers. The stability of the stretching tube was good, and non-uniform stretching state was not observed.

The obtained stretched film had an average thickness of 15.0 µm, and the thickness of each of the surface layers was 0.75 µm. The heat shrinkage at 100° C. was 33% in both the machine and transverse directions, and the propagation tear resistance was 9.0 g in the machine direction and 9.3 g in the transverse direction. As a result of evaluation of the packaging machine applicability, the film lacked firmness and the running of the film at the packaging machine became bad, so continuous high speed packaging was impossible. Though heat shrink packages having a tight feeling can be obtained at a shrinking tunnel temperature of 135 ° C., whitening of the film occurred at a temperature of not less than 150° C., thus giving packages having a poor appearance.

INDUSTRIAL APPLICABILITY

As mentioned above, the heat shrinkable polypropylene laminate film of the present invention has layers made of raw materials satisfying the respective specific conditions, so it has a good low temperature shrinkability and a good propagation tear resistance and in addition, is excellent in applicability to high speed packaging machines and heat resistance.

We claim:

1. A heat shrinkable polypropylene laminate film comprising surface layers and an intermediate layer and stretched at least two times in both the machine and transverse directions, wherein said surface layers comprise an isotactic polypropylene and said intermediate layer consists essentially of 50 to 100% by weight of a syndiotactic polypropylene and 0 to 50% by weight of an isotactic polypropylene, and wherein the thickness of said intermediate layer is at least 30% of the total thickness, the thickness of each of said surface layers is at least 1 μm, and the shrinkage at 100° C. is at least 25% in the machine and transverse directions.

2. The laminate film of claim 1, wherein the syndiotactic pentad fraction measured by $^{13}$C-NMR of said syndiotactic polypropylene in said intermediate layer is not less than 0.7.

* * * * *